United States Patent

Mayer

Patent Number: 5,706,761
Date of Patent: Jan. 13, 1998

[54] SYSTEM FOR PROVIDING WATER AND LIQUID FOOD TO ANIMALS

[76] Inventor: Gerald J. Mayer, 1556 Charmaine, Toledo, Ohio 43614

[21] Appl. No.: 599,853

[22] Filed: Feb. 12, 1996

[51] Int. Cl.[6] .................... A01K 7/00; A01K 1/03
[52] U.S. Cl. .................. 119/475; 119/417; 119/454
[58] Field of Search ........................ 119/417, 418, 119/454, 464, 475

[56] References Cited

U.S. PATENT DOCUMENTS

| | | | |
|---|---|---|---|
| 2,946,308 | 7/1960 | Harris. | |
| 3,122,127 | 2/1964 | Shechmeister et al. | 119/417 |
| 3,212,474 | 10/1965 | Higgins et al. | 119/475 |
| 3,216,397 | 11/1965 | Pickard. | |
| 3,334,614 | 8/1967 | Gass et al. | 119/475 |
| 3,771,496 | 11/1973 | Atchley | 119/72.5 |
| 3,942,668 | 3/1976 | Eberle et al. | 220/8 |
| 4,009,686 | 3/1977 | Gilchrist | 119/464 X |
| 4,022,159 | 5/1977 | Salvia | 119/496 |
| 4,067,627 | 1/1978 | Hodge | 312/100 |
| 4,401,056 | 8/1983 | Cody et al. | 119/477 |
| 4,424,641 | 1/1984 | Kyte | 119/475 X |
| 4,787,337 | 11/1988 | Mayer | 119/477 |

*Primary Examiner*—Robert P. Swiatek
*Assistant Examiner*—Elizabeth Shaw
*Attorney, Agent, or Firm*—Donald R. Fraser

[57] ABSTRACT

A system for providing water and liquid food to animals includes a container for water or liquid food, a support having an aperture for receiving the container and an elastomeric washer-like attachment having an inner wall and a spaced outer wall, the inner wall in intimate contact with the container and the outer wall having a portion extending outwardly from the container a sufficient distance to overlap the aperture in the support to thereby effectively support the container.

6 Claims, 1 Drawing Sheet

U.S. Patent  Jan. 13, 1998  5,706,761
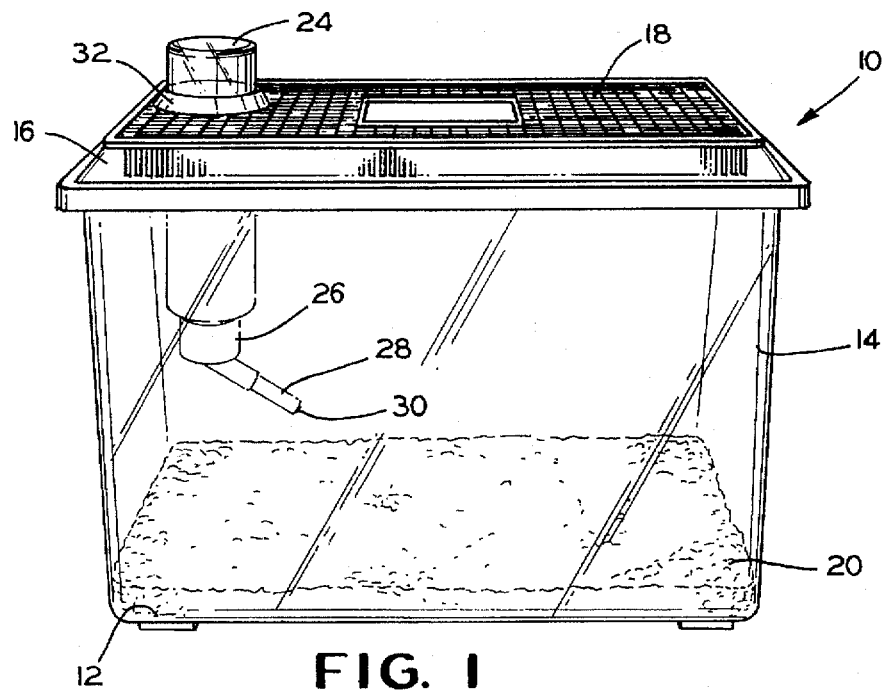
FIG. 1
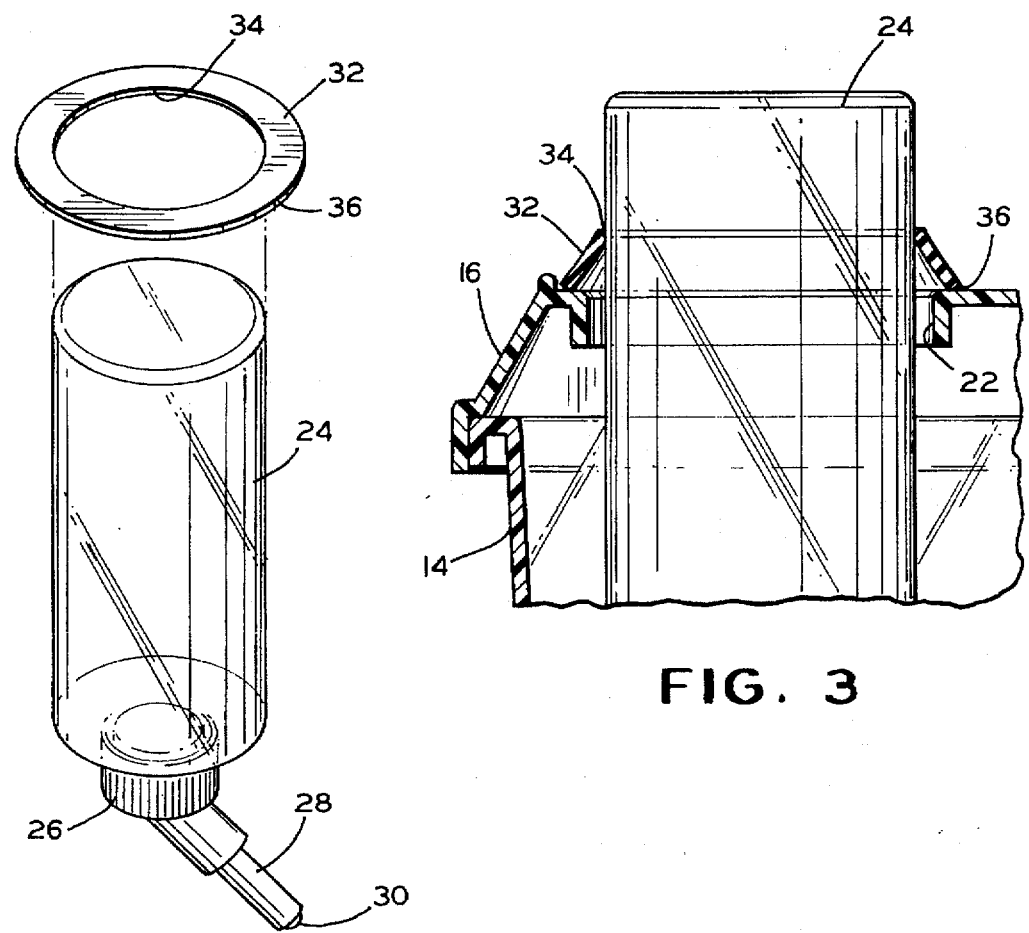
FIG. 2
FIG. 3

5,706,761

SYSTEM FOR PROVIDING WATER AND LIQUID FOOD TO ANIMALS

BACKGROUND OF THE INVENTION

1. Field of the Invention

The present invention relates to a system for providing water and liquid food to animals.

2. Prior Art

Small animals are typically maintained in a habitat provided with sources of water and food. Prior art habitats include containers for the liquid substituents are generally of the type illustrated, for example, in U.S. Pat. No. 4,787,337 Mayer. These containers include protective enclosures or shields and hanger devices for supporting the container within an associated habitat or cage. These hangers are normally of a metal hook-type and are designed to attach to the side wall or top of the habitat.

Typical open tube watering and feeding containers function in an inverted position with the open end of the outlet tube projecting downwardly in the animal's habitat or cage. Drainage out of the container is prevented by a meniscus surface which bridges the tube end and by a partial vacuum inside the container. The animals drink or feed by touching the meniscus surface with their tongue or teeth. Water or liquid droplets adhere to their tongue or teeth which they extract and drink. As they drink, air bubbles form at the tube tip and rise upwardly into the container to maintain a vacuum equilibrium.

Additionally, continual drippage may occur from an expansion inside the container cause by the diurnal temperature increase and of sloshing and spillage during container handling.

Also, there is the continuous unavoidable hazard of wick-action capillary drainage of the contents of the container where the tip of the outlet tube contacts piled-up bedding material or animal fur.

SUMMARY OF THE INVENTION

It is a primary object of the invention to produce a system for providing water and liquid food from a container to an animal within a habitat or cage.

Another object of the invention is to produce a system for providing water and liquid food for small animals from a container adjustably mounted within the habitat.

Another object of the invention is to produce a system for providing water and liquid food for small animals from a container which may be mounted in the lid of the animal habitat and will not interfere with the normal opening and closing of the lid.

The above, as well as other objects and advantages of the invention may be achieved by a system for providing water and liquid food to small animals which includes a container for water and liquid food, a support having an aperture for receiving the container, and an elastomeric washer-like attachment having an inner-wall in intimate contact with the container and an outer wall having a portion extending outwardly a sufficient distance to overlap the aperture in the support thereby effectively supporting the container in the support.

BRIEF DESCRIPTION OF THE DRAWINGS

Other objects and advantages of the invention will become readily apparent to one skilled in the art from reading the following detailed description of an embodiment of the invention when considered in the light of the accompanying drawings, in which:

FIG. 1 is a perspective view of a small animal habitat provided with a system in accordance with the inventions for providing water and liquid food to the small animals within the habitat;

FIG. 2 is an exploded view of the water and liquid food container of FIG. 1 and the washer-like attachment for supporting the container within the associated small animal habitat; and FIG. 3 is an enlarged fragmentary view partially in section illustrating the container and washer-like attachment seated within an aperture in the lid of the associated small animal habitat.

DETAILED DESCRIPTION OF THE PREFERRED EMBODIMENT OF THE INVENTION

Referring to the drawings there is shown a small animal habitat, generally indicated by reference numeral 10, which typically includes a bottom 12, four upstanding side walls 14, and a removable lid or top 16. The bottom 12, side walls 14 and the top 16 are typically formed of a plastic material such as polystyrene, for example. The side walls 14 are generally preferred to be formed of optically transparent material so that the activities of the small animal inhabitants may be viewed The top 16 is provided with an open grid-like structure 18 to permit the access of air into the interior of habitat 10.

A bedding material 20 such as cedar chips, for example, may be placed within the habitat to form a cover over the upper surface of the bottom 12 and a bedding for the animal inhabitants.

Many of the presently commercially available small animal habitats are provided with attachment apertures in the lid portions. In certain instances these apertures are made available through knock-out disk structures which may be readily physically removed to provide access to the interior of the habitat. Often times such openings are used to receive a system of trail tubes which enable the small animals to travel to adjacent habitats through a protected environment.

In the illustrated embodiment, the top 16 is provided with an aperture 22 used to receive a container 24. The container 24 has an end closure 26 of the well known type having internally formed threads adapted to cooperate with suitable externally formed threads on the reduced neck portion of the container 24. The closure 26 is further provided with an angled drinking tube 28 which is typically provided with valve means 30. While a number of different means can be employed, it has been found that satisfactory results may be readily achieved by utilizing the type illustrated and described in U.S. Pat. No. 3,771,496 issued.

The container 24 is maintained within the aperture 22 of the top 16 in an inverted condition such that the drinking tube 28 is positioned within the interior of the habitat 10 by an elastomeric washer-like attachment 32.

The attachment 32 has an inner annular wall 34 and a spaced outer annular wall 36. The diameter of the inner annular wall 34 is typically less than the diameter of the outer wall of the container 24. It has been found that satisfactory results have been obtained by utilizing an attachment 32 wherein the diameter of the inner wall 34 was 4.5 cm and the diameter of the outer wall of the container 24 was 5.0 cm.

When the attachment 32 is fitted over the outer wall of the container 24, the inner wall 34 is stretched causing the flat surfaces of the attachment 32 to assume the slanted position clearly illustrated in FIG. 3. It was found that unexpectedly such attachment configuration enabled the container 24 to be slid upwardly or downwardly to facilitate the proper disposition of the outlet of the drink tube 28 in respect of the bottom of the habitat 10, but also assured a positive maintenance of the position once selected. It seems that the greater the weight of the container 24 and the contents, the greater the frictional engagement between the attachment and the outer surface of the container 24.

In the operative position of the attachment 32, as shown in FIGS. 1 and 3, the outermost edge 36 of the attachment satisfactorily spans the aperture 22. In the preferred embodiment, the diameter of the outer surface 36 of the attachment was 6.75 cm.

While other materials could be utilized, it was found that satisfactory results were obtained by forming the container 24 is polyethylene plastic material and the attachment 32 from a synthetic rubber compound.

The invention has produced a system for supporting a watering and feeding container in an apertured support wherein the diameter of the container must be less than the diameter of the aperture in the support but may vary over a fairly broad range and still be adequately supported in the aperture by the elastomeric washer-like attachment.

In accordance with the provisions of the patent statutes, the principle and mode of operation of the present invention have been described in what has been considered to represent the preferred embodiment. However, it should be understood that the invention may be practiced otherwise than as specifically illustrated and described without departing from the scope of the attached claims.

What is claimed is:

1. A system for providing water and liquid food to animals comprising:

a container for water and liquid food, said container having an outer surface;

a support having an aperture for receiving said container; and an elastomeric washer-like attachment having an inner wall in intimate contact with said container whereby the frictional engagement between said attachment and the outer surface of said container enables said container to be slid relative to said attachment to permit selective adjustment and positively maintain the selected position of said container relative to said support and an outer wall having a portion extending outwardly a sufficient distance to overlap the aperture in said support to thereby effectively support said container in said support.

2. A system as defined in claim 1 wherein said support includes an animal habitat having a bottom, upstanding side walls, and a top.

3. A system as defined in claim 2 wherein the top of said habitat includes said aperture.

4. A system as defined in claim 1 wherein said container includes an annular outer wall portion.

5. A system as defined in claim 4 wherein the inner wall of said washer-like attachment is annular.

6. A system as defined in claim 5 wherein the inner wall of said washer-like attachment of a diameter less than the diameter of the annular portion of said container.

* * * * *